(12) United States Patent
Jo

(10) Patent No.: US 8,594,889 B2
(45) Date of Patent: Nov. 26, 2013

(54) INCLINATION CONTROLLING METHOD USING TORQUE VECTORING SYSTEM

(75) Inventor: Hee Young Jo, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 202 days.

(21) Appl. No.: 13/308,391

(22) Filed: Nov. 30, 2011

(65) Prior Publication Data

US 2013/0013150 A1 Jan. 10, 2013

(30) Foreign Application Priority Data

Jul. 8, 2011 (KR) .......................... 10-2011-0068016

(51) Int. Cl.
*G05D 1/00* (2006.01)
*G06F 7/00* (2006.01)

(52) U.S. Cl.
USPC ........ 701/41; 701/1; 701/10; 701/14; 701/36; 701/4; 701/42

(58) Field of Classification Search
USPC ......... 701/1, 10, 14, 36, 4, 41, 42, 45, 69, 70, 701/72, 78; 180/197, 248, 402, 410, 415, 180/421, 443, 446; 280/89.1, 89.12, 93.5
See application file for complete search history.

(56) References Cited

FOREIGN PATENT DOCUMENTS

| JP | 2006-168715 A | 6/2006 |
|---|---|---|
| JP | 2009-62030 A | 3/2009 |
| KR | 10-0552539 B1 | 2/2006 |
| KR | 10-2008-0012464 A | 2/2008 |
| KR | 10-2009-0006275 A | 1/2009 |

*Primary Examiner* — Ian Jen
(74) *Attorney, Agent, or Firm* — Morgan, Lewis & Bockius LLP

(57) ABSTRACT

An inclination control method using a torque vectoring system, may include a) detecting a vehicle speed, a steering angle, a yaw rate, and a steering torque of a vehicle, b) determining whether the vehicle may be tending to be inclined according to detected values of the vehicle speed, the steering angle, the yaw rate, and the steering torque, c) determining a torque vectoring duty according to the magnitude of the steering angle and the yaw rate when it may be determined that the vehicle may be tending to be inclined, and d) controlling the torque vectoring system according to the determined torque vectoring duty.

14 Claims, 4 Drawing Sheets

INCLINATION CONTROLLING METHOD USING TORQUE VECTORING SYSTEM

CROSS-REFERENCE TO RELATED APPLICATION

The present application claims priority to Korean Patent Application No. 10-2011-0068016 filed in the Korean Intellectual Property Office on Jul. 8, 2011, the entire contents of which is incorporated herein for all purposes by this reference.

BACKGROUND OF THE INVENTION

1. Field of the Invention

The present invention relates to a control method for preventing inclination of a vehicle. More particularly, the present invention relates to a control method for preventing an inclination phenomenon that uses a torque vectoring system after determining an inclination condition.

2. Description of Related Art

Generally, a four wheel drive (4WD) system divides engine torque to transfer it to front wheels and rear wheels such that starting and hill climbing ability can be improved, and particularly, a torque vectoring system divides the driving torque of the rear wheels to transfer it to left and right rear wheels such that the agility and the stability of the vehicle are improved when the vehicle starts or turns on a road such that the torque of the right and left wheels are different.

A conventional torque vectoring system calculates an understeer compensation value while an understeer is being generated so as to compensate the understeer such that torque of an inner wheel is transferred to an outer wheel to improve agility of the vehicle, and calculates an oversteer compensation value while an oversteer is being generated so as to compensate the oversteer such that torque of the outer wheel is transferred to the inner wheel to improve the stability of the vehicle.

An exemplary embodiment of the torque vectoring system is shown in FIG. 4, wherein the torque vectoring system is connected to a differential apparatus, which is powered through a propeller shaft 10, at the rear of a vehicle, wherein a left torque vectoring unit 40 and a right torque vectoring unit 30 are disposed at a left side and a right side of a rear axle 20, respectively, and a motor 50 is operated to transfer optimal torque to the drive wheels when it is necessary to distribute more driving torque to the right or left rear wheel.

In a prior art, when the vehicle is inclined to one side along a curved road, the driver recognizes the inclination condition and direct control of the steering wheel or the torque vectoring system is used to compensate the inclination condition.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a control method having advantages of actively distributing driving torque to a right rear wheel and a left rear wheel.

In an aspect of the present invention, an inclination control method using a torque vectoring system, may include a) detecting a vehicle speed, a steering angle, a yaw rate, and a steering torque of a vehicle, b) determining whether the vehicle is tending to be inclined according to detected values of the vehicle speed, the steering angle, the yaw rate, and the steering torque, c) determining a torque vectoring duty according to the magnitude of the steering angle and the yaw rate when it is determined that the vehicle is tending to be inclined, and d) controlling the torque vectoring system according to the determined torque vectoring duty.

The b) step may include determining whether the steering angle is within a predetermined value based on the zero point of the steering angle, wherein the b) step may include determining whether a plus/minus sign of the steering angle is equal to that of the steering torque, wherein the b) step may include determining whether a plus/minus sign of the yaw rate is equal to that of the steering torque, wherein the predetermined value is approximately within ±10°, wherein the b) step may include determining whether the yaw rate is within a predetermined threshold value, wherein the yaw rate is set as map data according to the magnitude of the vehicle speed and the steering angle.

The b) step may include determining whether the yaw rate is within a predetermined threshold value, wherein the yaw rate is set as map data according to the magnitude of the vehicle speed and the steering angle, wherein the b) step may include determining whether a plus/minus sign of the steering angle is equal to that of the steering torque, wherein the b) step may include determining whether a plus/minus sign of the yaw rate is equal to that of the steering torque, wherein the yaw rate is set as map data according to the magnitude of the vehicle speed and the steering angle.

The torque vectoring duty is set as map data according to the magnitude of the steering angle and the yaw rate.

A first torque vectoring unit is operated when the vehicle is tending to be inclined to a first side of the vehicle and a second torque vectoring unit is operated when the vehicle is tending to be inclined to a second side in the b) step.

The exemplary embodiments of the present invention uses measured values from sensors that are disposed in the vehicle to determine whether there is an inclination phenomenon or not, and if so, the inclination phenomenon is compensated by a torque vectoring system.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
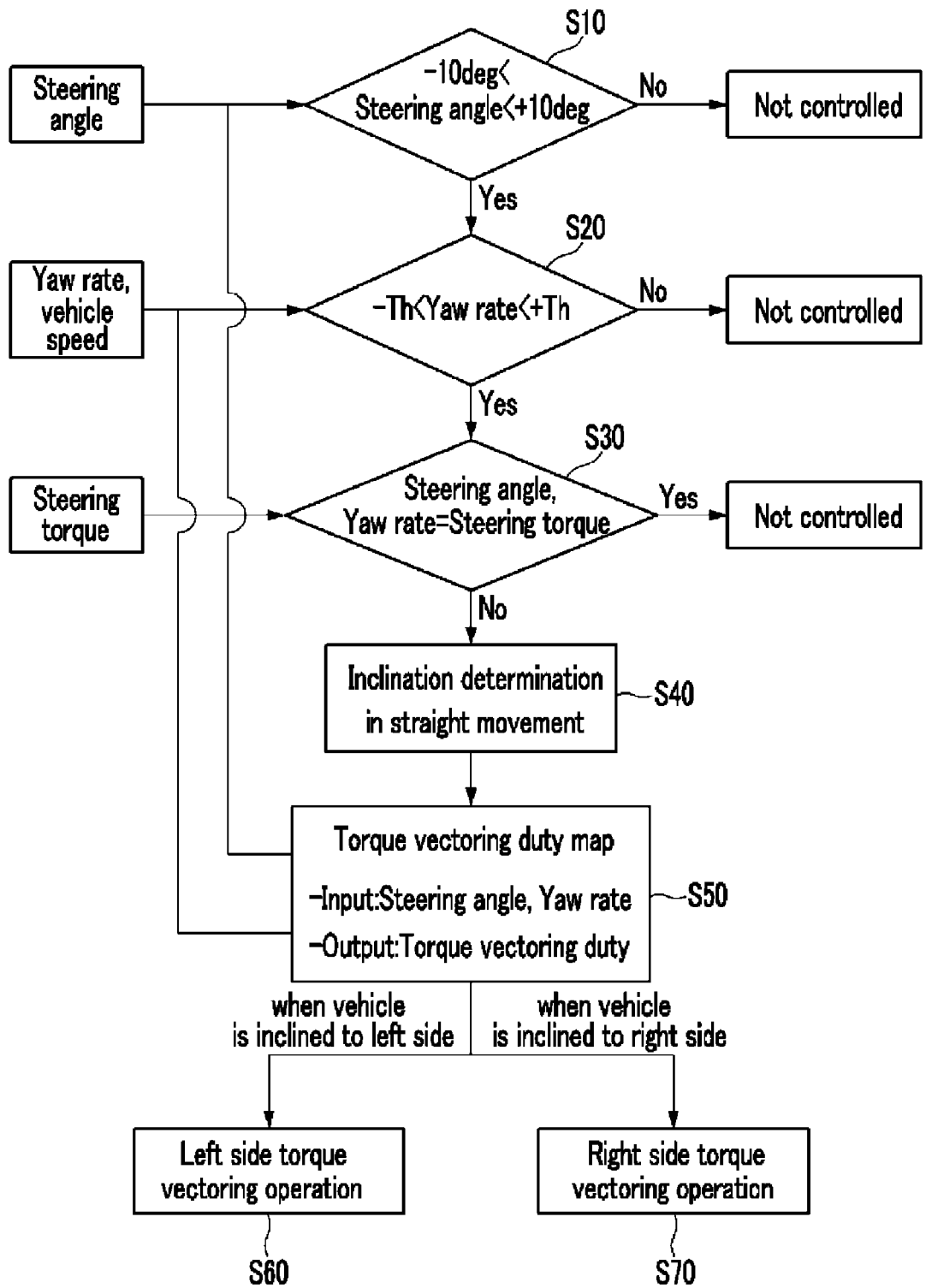
FIG. 1 is an inclination control flowchart according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described with reference to the accompanying drawings in order for those skilled in the art to be able to implement the invention.

An exemplary embodiment of the present invention relates to a control method for compensating inclination when an inclination phenomenon is being generated such that a vehicle can run straight.

Generally, a vehicle inclines to one side when it operates because of a curve degree, a suspension system misalignment, or a tire condition.

The inclination phenomenon according to an exemplary embodiment of the present invention signifies a condition in which the vehicle is biased from a straight line by more than 1 m to a right side or a left side when the vehicle runs 100 m at a 60 km/h speed.

The inclination phenomenon is generated by the following causes.

The vehicle may deviate from a straight line because of an asymmetric structure of a vehicle, a characteristic difference between a left tire and a right tire, or a slant difference along a width direction of the road.

In this condition, force is differently applied to right and left tires such that a moment is differently applied to a king pin shaft. When the different moment is applied to the king pin shaft, a reaction force is formed in a steering device, and the asymmetric force is generated thereby such that the vehicle inclines to one side from a straight line.

In an exemplary embodiment of the present invention, a torque vectoring system is used to prevent the inclination phenomenon.

Hereinafter, referring to FIG. 1, a control method using a torque vectoring system is described according to an exemplary embodiment of the present invention.

FIG. 1 is an inclination control flow chart according to an exemplary embodiment of the present invention.

Firstly, it has to be determined whether an inclination phenomenon is being generated or not, and a vehicle speed, a steering angle, a yaw rate, and a steering torque are detected by sensors that are provided in the vehicle in an exemplary embodiment of the present invention.

It is determined whether the steering angle is within ±10° based on a zero point so as to determine the inclination phenomenon in S10, and if the condition is satisfied, it is determined whether the yaw rate is in a threshold value (yaw rate Th) in S20.

If the steering angle is 0°, separate control is not necessary since the vehicle is not inclined. Also, when the steering angle gets out of the range, since the driver can adjust the steering angle, separate control is not necessary.

Further, if the yaw rate is out of the threshold value, the separate control is not performed. This is because the driver direct controls the system, and when the yaw rate gets out of the threshold value, the separate control is not necessary. Here, the threshold value (yaw rate Th) of the yaw rate can be contained in map data that is made depending on the vehicle speed and the steering angle. This is shown in FIG. 2.

Figure 2:
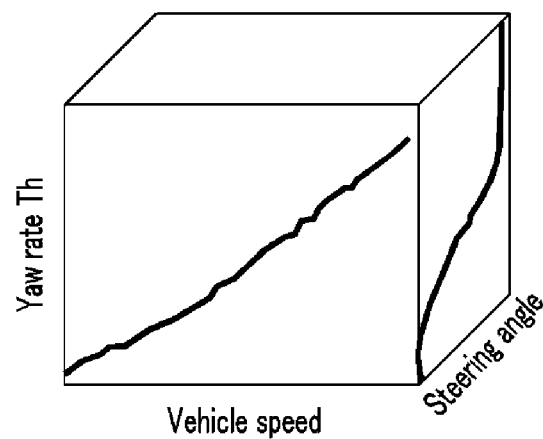
FIG. 2 is a graph showing a relation of a yaw rate threshold, a vehicle speed, and a steering angle according to an exemplary embodiment of the present invention.

FIG. 2 is a graph showing a relation of a yaw rate threshold, a vehicle speed, and a steering angle according to an exemplary embodiment of the present invention. Referring to FIG. 2, it can be known that the yaw rate is increased when the steering angle is increased and the vehicle speed is raised, but this condition is only an exemplary embodiment and the present invention is not limited thereto.

So far, it has been described that the steering angle is within ±10° and the yaw rate is within the threshold value, however, if the steering angle is within ±10° or the yaw rate is within the threshold value, the inclination phenomenon of the vehicle can be diagnosed or compensated.

The steering angle and the yaw rate are both to be within a predetermined range so as to stably control the system.

It is determined whether a plus or minus sign of the steering angle and the yaw rate is equal to that of the steering torque in S30.

If the plus or minus sign of the steering angle and the yaw rate is equal to that of the steering torque, it is determined that the driver controls the steering angle and the yaw rate and therefore the separate control is not necessary. In such a case, the plus or minus sign(+, −) of the steering angle is equal to that of the yaw rate except special condition.

As described above, if the steering angle and the yaw rate are within a predetermined range and the plus or minus sign of the steering angle and the yaw rate is different from that of the steering torque, it is determined that the vehicle is tending to be inclined to one side in straight driving in S40.

As described above, if it is determined that the vehicle is inclined in a condition of straight movement, the duty of the torque vectoring is controlled to control the inclination phenomenon in S50, wherein the duty of the torque vectoring is set as the map data, and therefore if the steering angle and the yaw rate are input, the duty value of the torque vectoring is output.

Figure 3:
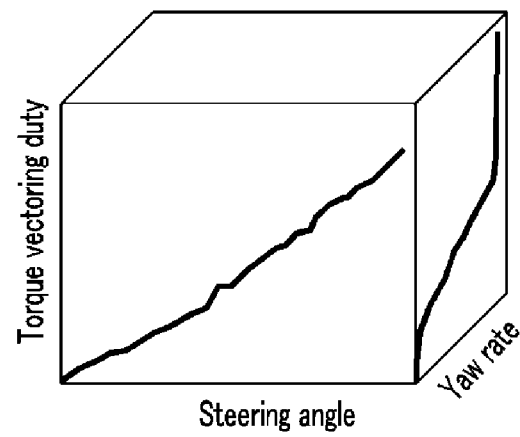
FIG. 3 is a graph showing a relation of a steering angle, a yaw rate, and a torque vectoring duty according to an exemplary embodiment of the present invention.
Figure 4:
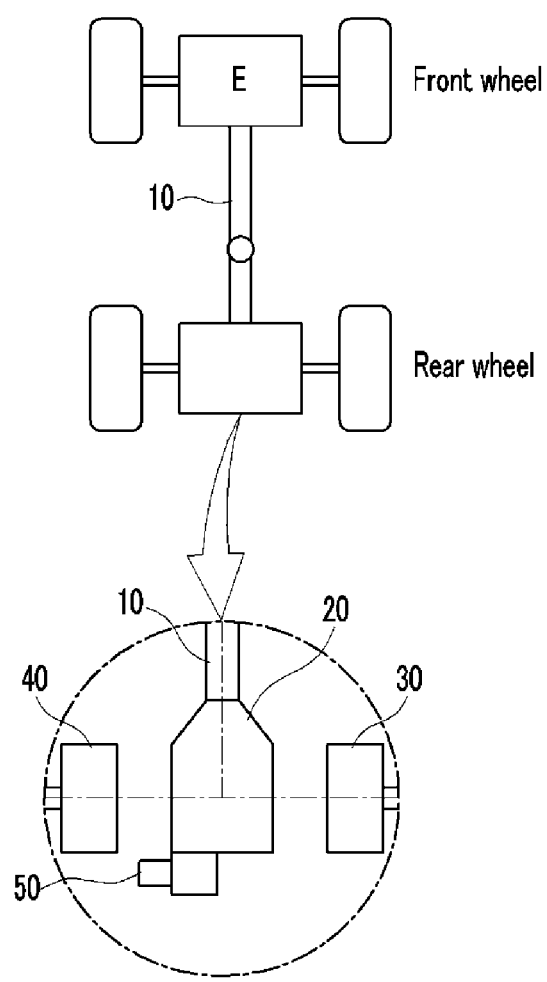
FIG. 4 is a schematic diagram of a general torque vectoring system.

The inclination is controlled according to the duty value of the output torque vectoring, and as shown in FIG. 3, the torque vectoring duty value is increased while the magnitudes of the yaw rate and the steering angle are increased. However, the relation thereof is only an exemplary embodiment of the present invention and is not limited thereto.

That is, the threshold value (yaw rate Th) of the yaw rate is calculated using the vehicle speed and the steering angle and the duty value of the torque vectoring is calculated using the steering angle and the yaw rate.

If the vehicle is tending to be inclined in a left direction in straight driving, the duty value of the torque vectoring operates the left torque vectoring unit in S60 such that the driving torque of the left side drive wheel is increased to generate a moment in a right-side direction.

And, vice versa, if the vehicle is tending to be inclined in a right direction in straight driving, the duty value of the torque vectoring operates the right torque vectoring unit in S60 such that the driving torque of the right side drive wheel is increased to generate a moment in a left-side direction.

When the inclination phenomenon is compensated as described above, the straight movement of the vehicle can be stably maintained.

For convenience in explanation and accurate definition in the appended claims, the terms "left" and "right" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inclination control method using a torque vectoring system, comprising:
    a) detecting a vehicle speed, a steering angle, a yaw rate, and a steering torque of a vehicle;
    b) determining whether the vehicle is tending to be inclined according to detected values of the vehicle speed, the steering angle, the yaw rate, and the steering torque;
    c) determining a torque vectoring duty according to the magnitude of the steering angle and the yaw rate when it is determined that the vehicle is tending to be inclined; and
    d) controlling the torque vectoring system according to the determined torque vectoring duty.

2. The inclination control method of claim 1, wherein the b) step includes determining whether the steering angle is within a predetermined value based on the zero point of the steering angle.

3. The inclination control method of claim 2, wherein the b) step includes determining whether a plus/minus sign of the steering angle is equal to that of the steering torque.

4. The inclination control method of claim 2, wherein the b) step includes determining whether a plus/minus sign of the yaw rate is equal to that of the steering torque.

5. The inclination control method of claim 2, wherein the predetermined value is approximately within ±10°.

6. The inclination control method of claim 2, wherein the b) step includes determining whether the yaw rate is within a predetermined threshold value.

7. The inclination control method of claim 6, wherein the yaw rate is set as map data according to the magnitude of the vehicle speed and the steering angle.

8. The inclination control method of claim 1, wherein the b) step includes determining whether the yaw rate is within a predetermined threshold value.

9. The inclination control method of claim 8, wherein the yaw rate is set as map data according to the magnitude of the vehicle speed and the steering angle.

10. The inclination control method of claim 8, wherein the b) step includes determining whether a plus/minus sign of the steering angle is equal to that of the steering torque.

11. The inclination control method of claim 8, wherein the b) step includes determining whether a plus/minus sign of the yaw rate is equal to that of the steering torque.

12. The inclination control method of claim 8, wherein the yaw rate is set as map data according to the magnitude of the vehicle speed and the steering angle.

13. The inclination control method of claim 1, wherein the torque vectoring duty is set as map data according to the magnitude of the steering angle and the yaw rate.

14. The inclination control method of claim 1, wherein a first torque vectoring unit is operated when the vehicle is tending to be inclined to a first side of the vehicle and a second torque vectoring unit is operated when the vehicle is tending to be inclined to a second side in the b) step.

* * * * *